June 1, 1954     H. H. GORRIE ET AL     2,679,862
CONTROL APPARATUS

Original Filed Sept. 2, 1948     3 Sheets-Sheet 1

INVENTORS
HARVARD H. GORRIE
AND JACK F. SHANNON
BY
ATTORNEY

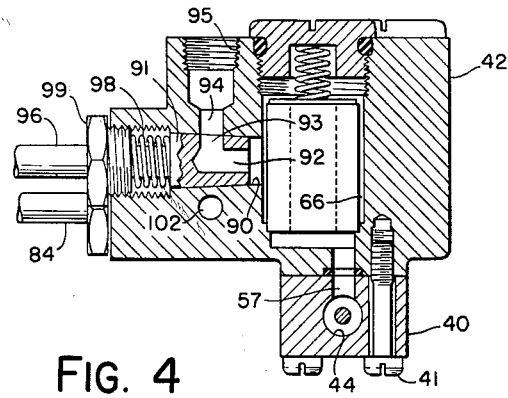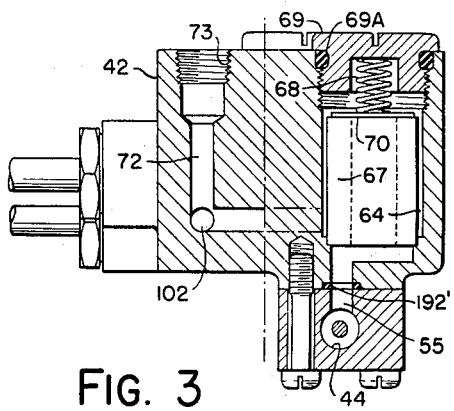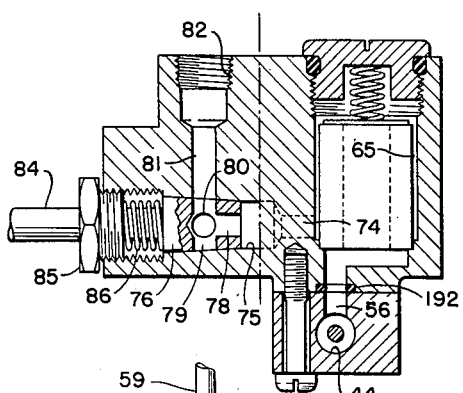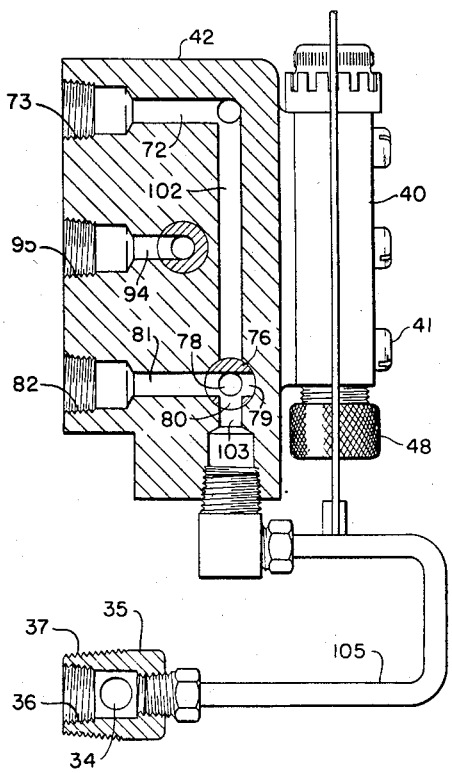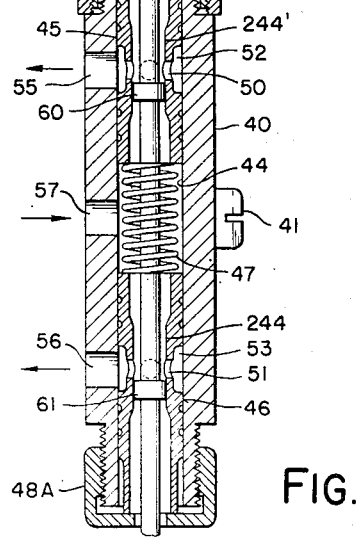
INVENTORS
HARVARD H. GORRIE
AND JACK F. SHANNON
BY Raymond W. Jenkins
ATTORNEY INVENTOR.
HARVARD H. GORRIE
AND JACK F. SHANNON
BY Raymond W. Jenkins
ATTORNEY Patented June 1, 1954

2,679,862

UNITED STATES PATENT OFFICE 2,679,862

CONTROL APPARATUS

Harvard H. Gorrie, Cleveland Heights, and Jack F. Shannon, Euclid, Ohio, assignors to Bailey Meter Company, a corporation of Delaware Original application September 2, 1948, Serial No. 47,516. Divided and this application August 31, 1950, Serial No. 182,512

7 Claims. (Cl. 137—622)

This invention relates to regulating mechanisms, and more particularly to mechanisms which operate to position a control device in response to changes in a loading pressure.

It is frequently necessary that a regulating means be provided for controlling the operation of a control element so as to maintain a condition such as temperature, pressure, fluid level, rate of flow, etc., at some predetermined value. Such regulating means may include a device subjected to a loading pressure varying with the value of the condition and operating on changes in the pressure to position the control element. The type of control apparatus employed will differ somewhat with the control function to be performed; for instance, the flow of fluid may be controlled in one case by a valve connected to a diaphragm which is subjected on only one side to a control pressure, and, in another case, the flow may be controlled by an element connected to a piston which is subjected at its opposite ends to pressures varying with the condition. The regulating means should be adapted for use with the different types of control apparatus, and should be changeable easily to manual or automatic operation regardless of the type of apparatus controlled.

An object of our invention is to provide an improved regulating mechanism. Another object is to provide an improved mechanism for determining a control pressure in response to changes in a condition. Still another object is to provide a mechanism which is adjustable for operation automatically or manually to determine a control pressure. Yet another object is to provide a regulating mechanism which is adapted for use with different types of control elements in performing a control function. Another object is to provide an improved mechanism operating in response to a loading pressure for producing a control motion, the mechanism being easily adjustable for varying the relationship between the loading pressure and the motion obtained, both as to characteristic and amount.

A principal object of our invention is to provide fluid pressure responsive servo-motors arranged to take into account the capacity, range, leakage, flow characteristics and other variables of the valves, dampers, and the like devices which the servo-motor positions and to produce a desired relationship between loading pressure and rate of flow of the fluid, or rate of change of the variable, being controlled. To easily accommodate a standard regulating mechanism to valves or dampers of undesirable characteristics and compensate therefor in the positioning of the valve or damper. Furthermore, to provide the possibility of changing the valve or regulator characteristic on an operating installation, and finally to take into account the characteristics of a plurality of regulators and correlate them to produce an integrated control system of a process, or specifically in the proportioning of a plurality of flowing fluids in desirable degree and manner.

There is shown in the accompanying drawings a preferred form of our regulating mechanism and different arrangements of the mechanism for performing control functions.

This application constitutes a division of our copending application S. N. 47,516 filed September 2, 1948, and is directed particularly to the features of the pilot valve, its construction, arrangement, operation and functioning.

Figure 1:
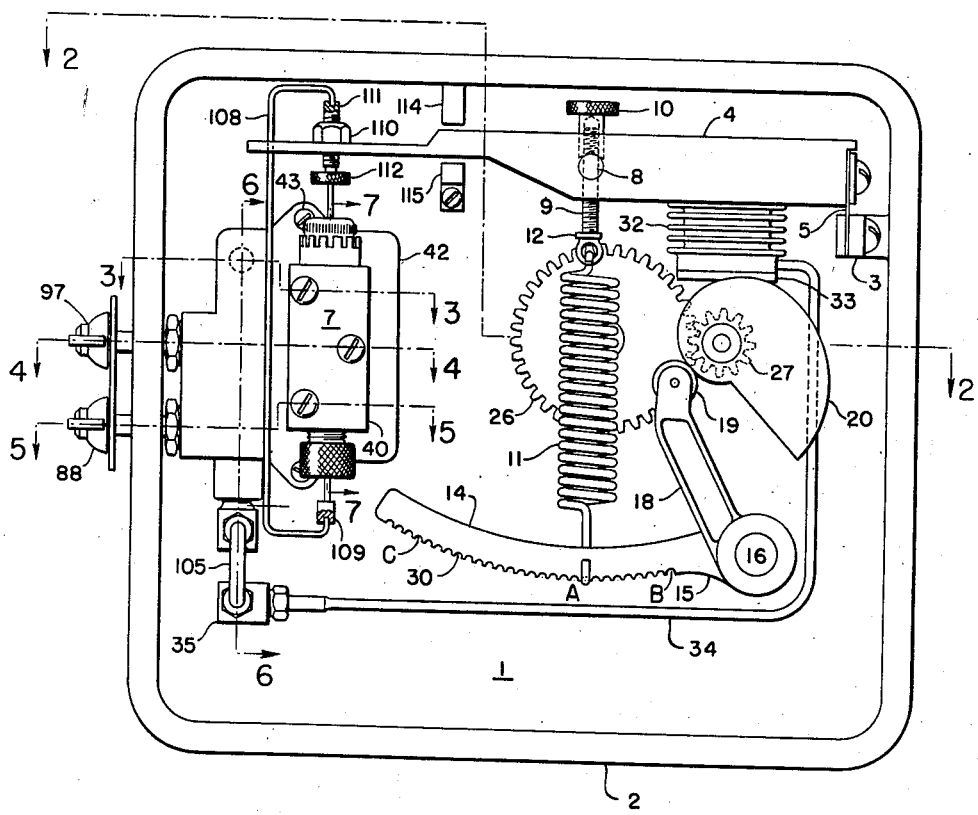
Fig. 1 is a front elevational view of our improved regulating mechanism with the front cover removed.

Figs. 3, 4 and 5 are enlarged horizontal sectional views taken on the planes of the lines 3—3, 4—4 and 5—5 of Fig. 1.

Figs. 6 and 7 are enlarged vertical sectional views taken on the planes of the lines 6—6 and 7—7 of Fig. 1.

Figure 8:
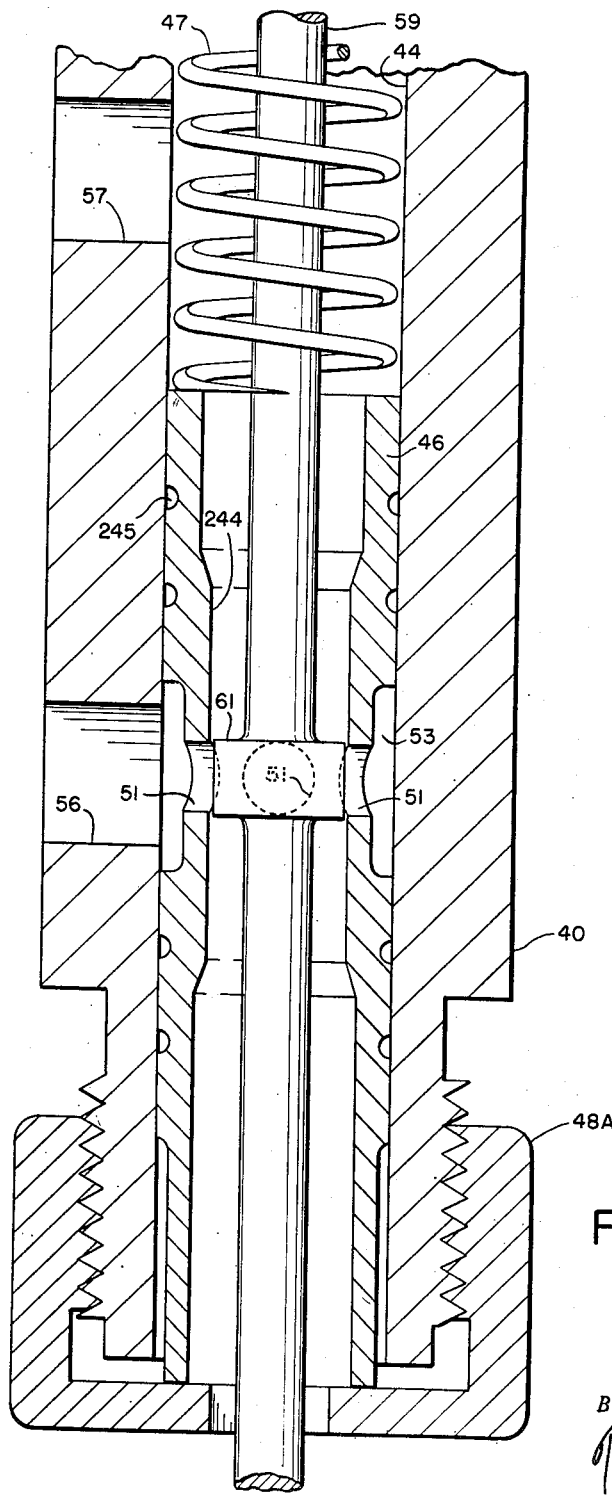

Fig. 8 is an enlarged sectional elevation of the lower portion of the pilot valve of Fig. 7.

Figure 2:
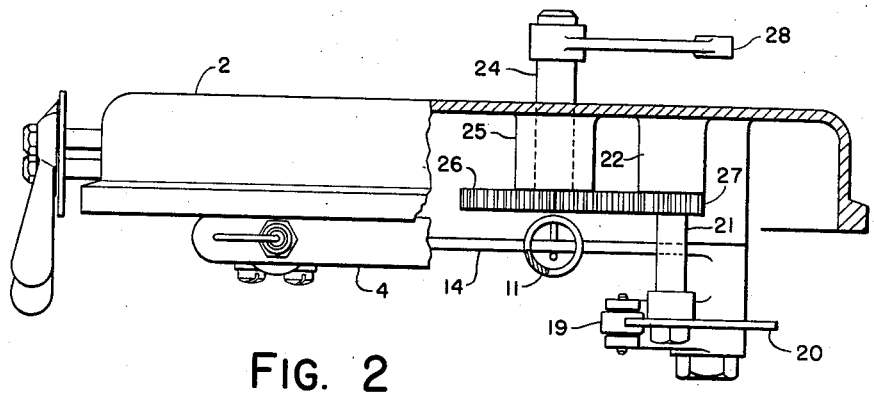
Fig. 2 is a view of the regulating mechanism taken substantially on the planes of the line 2—2 of Fig. 1.

Referring to the drawings, it will be noted that there is shown a regulating mechanism or positioner, generally designated 1, including a casing 2 having a boss portion 3 to which one end of a beam 4 is pivotally connected by a flexible element 5. The other end of the beam is arranged to position a pilot valve 7 which will be described shortly in detail. Pivotally supported by the beam, at a point approximately mid way between its ends, is a member 8 having an opening through which a bolt 9 extends for threaded engagement with a thumb nut 10 resting upon the member 8. A coiled spring 11 is attached at one end to an eye piece 12 on the bolt, and is hooked at its other end to an arm 14 of a bell crank 15 pivotally supported at 16 by the casing 2. An arm 18 of the bell crank carries a roller 19 which engages a cam 20 removably fixed, as shown in Fig. 2, to a shaft 21, rotatably supported by a boss 22 formed integral with the casing. Another shaft 24 extends through an opening in a boss 25 on the casing and carries a gear 26 meshing with a pinion gear 27 fixed to the shaft 21. Attached to the shaft 24 at the rear of the casing is a crank 28 adapted to be actuated by means for rotating the gear 26 in one direction or the other.

When the gear 26 is rotated in a clockwise direction as viewed in Fig. 1, the gear 27 is rotated in a counterclockwise direction. The cam 20 turns with the gear 27 and swings the bell crank about its pivot 16 in a direction to increase the tension of the spring 11. A rotation of the gear 26 in a counterclockwise direction results in a turning of the cam to permit the bell crank to swing in a direction so that the spring tension is decreased. The loading of the spring for predetermined angular movements of the bell crank may be varied, as desired, by hooking the lower end of the spring to the arm 14 at different points along its length. To prevent the spring from slipping along the arm, there are provided notches 30 for receiving the hooked end of the spring.

The arrangement provides a simple range adjustment so that full controlled regulator motion can be obtained with one half normal loading pressure change in bellows 32 or half motion for full loading pressure change. With the spring 11 approximately vertical as shown in Fig. 1 the lower end is at location A and normal rotation of the cam will increase the spring tension to balance a loading pressure of from 5 to 25 p. s. i. for example. With the spring moved in toward pivot 16 to location B, normal rotation of the cam will only increase the spring tension enough to balance a 10 p. s. i. change or from 5 to 15 p. s. i., while location C will change the spring tension enough to balance a pressure change of 5 to 25 p. s. i. with only half rotation of the cam 20. The knurled nut 10 is used to set the starting point at 5 p. s. i. loading pressure for zero travel of cam 20.

Arranged between the pivot 5 of the beam 4 and the spring support 8 is a bellows 32 acting against the lower side of the beam and supported by a projecting portion 33 formed integral with the casing 2. A conduit 34 communicates with the interior of the bellows and is connected to a coupling 35 having, as shown in Fig. 6, an opening 36 adapted to receive a suitable fluid supply. The coupling, as shown herein, is provided with a portion 37 which may be threaded into an opening in the rear wall of the casing for holding it in place.

The pilot valve 7 comprises, as shown in Figs. 3 to 8, a valve block 40 connected, as by bolts 41, to a block 42 which is attached, as shown in Fig. 1, by bolts 43 to the rear wall of the casing. Formed in the valve block 40, normal to the longitudinal axis of the beam 4, is a bore 44 containing sleeve shaped members 45 and 46 which are urged by a spring 47 into engagement with caps 48 and 48A threadedly connected to the block at the ends of the bore. Formed in the sleeve members 45, 46 are circular ports 50 and 51 opening into annular grooves 52 and 53 in the outer peripheries of the members. Opening through the valve block into communication with the grooves 52, 53 are ports 55 and 56, and opening through the valve block into communication with the bore 44 at a point between the sleeve members is a port 57. Extending through the sleeve members is a valve stem 59 carrying lands 60 and 61 slideably engaging the inner walls of the sleeve members and cooperating with the ports 50 and 51, respectively, for controlling communication between the ports and the spaces within the sleeve members at opposite sides of the lands. The valve stem 59 extends through openings in the caps 48 and 48A with sufficient clearance to provide a venting of fluid to the atmosphere.

The ports 55, 56 and 57 communicate, as shown in Figs. 3, 5 and 4 respectively, with the ends of bores 64, 65 and 66 in the block 42. Arranged in each of the these bores is a sleeve shaped filter 67 which is held in engagement with a shoulder at one end by a spring 68 acting between a removable plug 69 and a plate 70 covering the other end of the filter. Formed in the block 42 (Fig. 3) is a passage 72 communicating at one end with the bore 64 and terminating at its other end in an enlarged threaded opening 73 adapted to receive a fluid connection.

The bore 65 is connected by a passage 74 to the inner end of a tapered bore 75 in which a valve member 76 is rotatably received. The inner portion of the valve member is provided with an axial passage 78 which communicates at the mid portion of the valve member with a diametrical passage 79 and a radial passage 80 at right angles to the passage 79. A passage 81 in the block 42 opens at one end into the bore 75 to communicate with the passage 79 or 80, and terminates at its other end in an enlarged threaded opening 82 adapted to receive a fluid connection. The valve 76 is provided with a stem 84 extending through a plug 85, and a spring 86 acts between the plug and the valve for holding the latter in place within the bore 75. The valve stem 84 extends through an opening in the casing 2, as shown in Fig. 1, and has an operating handle 88 attached thereto at the exterior of the casing.

As shown in Fig. 4, a tapered bore 90 opens into the bore 66 and contains a valve member 91 having an axial passage 92 communicating with a radial passage 93. A passage 94 in the block 42 is adapted to communicate at one end with the passage 93, and terminates at its other end in an enlarged threaded opening 95. The valve member 91 is provided with a stem 96 extending through an opening in the casing and carrying an operating handle 97 at the exterior of the casing. A spring 98 acts between a plug 99 and the valve member 91 for holding the latter within the bore 90.

The valve member 91 is provided, as will be soon pointed out, for controlling the supply of pressure fluid from the passage 94 through the filter in the bore 66, and the port 57 to the interior of the sleeve members in the pilot valve. When the stem 59 of the pilot valve is in the position shown in Fig. 7, the pressure fluid passes from the interior of the sleeve members through the port 56, the filter in the bore 65, and the passage 74 to the axial passage 78 in the valve member 76. The port 55 of the pilot valve is connected at this time through the upper portion of the sleeve member 45 and the clearance around the valve stem to atmosphere for venting the passage 72 in Fig. 3. If the pilot valve is moved to position the lands above the ports 50 and 51, pressure fluid will be supplied through the port 55 to the passage 72, and pressure will be vented from the axial passage of the valve member 76 through the port 56. The lands 60 and 61 will normally be moved in one direction or the other to uncover the ports 50 and 51 only a small amount to pressure fluid supply and exhaust.

As shown in Fig. 6, a passage 102 is provided in the block 42 for connecting the passage 72 in communication with the bore for the valve 76 so that it may communicate with the passages 79 or 80 when the valve is rotated to the proper positions. Another passage 103 opens into the bore for the valve 76 and is connected by a conduit 105 in communication with the interior of the coupling 35. For certain types of control, it is necessary that there be no communication between the valve 76 and the coupling 35. At this time the conduit 105 may be removed, and the openings in the coupling 35 and at the lower end of the passage 103 may be closed by suitable plugs.

The assembly provides an extremely compact arrangement with a minimum of external connections and piping. The three replaceable cartridge type filters 67 are held in place by plugs 69 pressure-sealed to block 42 by O-ring packings 69A. The three passages 55, 56 and 57 of block 40 are pressure-sealed to matching passages in block 42 by O-ring packings in recesses 192 wherein may be located timing or speed orifices regulating speed of damper or valve movement.

For connecting the stem 59 of the pilot valve to the beam 4 for positioning thereby, there is provided a spring rod 108 bent as shown in Fig. 1 and having its lower end fitting loosely in a recess formed in an enlargement 109 of the lower end of the valve stem. Fixed to the beam is a nut 110, and a bolt 111 is threaded through the nut and is provided at its lower end with a head 112 having a flat surface which is engageable by the upper end of the valve stem. The rod 108 extends through an opening in the beam 4 and has its upper end fitting loosely in a recess formed in the upper end of the bolt 111. A spring action is provided by the rod 108 for yieldingly supporting the valve stem with its upper end in engagement with the flat surface on the head 112. It will be appreciated that this arrangement permits a mounting of the pivoted beam out of alignment with the pilot valve without affecting the operation of the latter. With the rod extending through an opening in the beam, it is prevented from swinging about its ends into positions where it might obstruct the operation of the mechanism. The rod 108 may be easily sprung to release the pilot valve for removal, if desired.

Referring now particularly to Fig. 8 it will be noted that this is an enlargement of the lower half of Fig. 7 and is a vertical section to about 6 times actual size of the lower half of pilot valve 7. The arrangement provides an improved pilot valve particularly adapted for the establishment of pneumatic loading pressures useful in servomotors for positioning regulating devices such as valves, dampers and the like. Through the use of air as a pressure fluid the waste or bleed may go to the atmosphere and it is unnecessary to provide drains or sumps as is the case when oil or other liquid might be used as the pressure fluid.

The block 40 has an axial bore 44 in which are two sleeve members 45, 46 which may be identical but are inverted, the one relative to the other, in the bore in which they are slidably fitted. The overall bearing length of sleeve 46 (for example) in bore 44, is considerable, compared to the length of the inner bore 244 of the sleeve, and is provided not only with fairly close clearance with bore 44 but, on each side of groove 53, has two or more cannelures to serve as a labyrinth minimizing the possibility of air leaking between the sleeve 46 and bore 44. The cannelures further provide a depository for a small amount of grease with which the outer surface of sleeve 46 may be lightly coated at assembly so that the sleeve will not freeze in bore 44.

The length of the accurately machined bore 244 need only be about three times the length (axially) of the cylindrical land 61 to provide for the land in a position just clear of ports 51 either above or below the ports. In the present assembly the length of land 61 is $\frac{3}{32}$ inch so that the length of the accurately bored and lapped section 244 need only be about ¼ inch, thus considerably decreasing the time and cost of a similar bore coextensive in length with the sleeve. The truss-like shape of longitudinal section through the sleeve, provided by the annular recess 53 between the bearing areas which engage bore 44, facilitates full bearing of the areas in bore 44 without distortion of bore 244. Furthermore, the relatively short length of accurate bores 244, 244', compared to the distance spacing said bores in main bore 44, minimizes trouble due to misalignment of bore 244 with bore 244' through distortion of sleeve 45 or sleeve 46 in manufacture, storage, or when assembled in bore 44, or through lack of concentricity of bore 244 or 244' with the exterior of sleeve 45 or 46, or from lack of axial parallelism of the cylindrical surfaces of lands 60 and 61.

All of these features of construction of sleeves 45, 46, bore 44, and stem 59 with its lands 60, 61, result in an assembly wherein the sleeves and stem may be readily assembled and disassembled, for inspection or cleaning, without fear of increasing leakage or introducing friction, or of other troubles. When assembled for operation the clearance of land 60 in bore 244' and the clearance of land 61 in bore 244 is minute, thus minimizing fluid leakage past the lands, as compared to prior structures having relatively longer bores 244, 244' and closer spaced lands. Furthermore, these advantages are obtained with decreased time and expense of manufacture, closer tolerances, inspection rejects, etc.

The lands 60, 61 are preferably of cylindrical shape with sharp cut off corners, positioned relative to four round holes 51 equally spaced around the sleeve 45 or 46. In the present example the length of the land is $\frac{3}{32}$ inch while the diameter of holes 50, 51 is substantially the same; if anything, the diameter of the holes may be very slightly less than the length of land so that at neutral there is a complete overlap of holes 51 by land 61. Even so, there will be a very small leakage of air past the lands 60, 61, to atmosphere, from the supply 57, as well as a very small leakage of air into 55 and 56 from 57 and out of 55 and 56 (past lands 60, 61) to atmosphere. Such leakage is inconsequential so far as power-cost is concerned but serves two useful purposes. Leakage past the lands 60, 61, in bores 244, 244' serves to center the lands and prevent friction against bores 244, 244' by providing a lubricating film of air between the surface of the land and the bore. Slight movement of air into and out of 55, 56 (at neutral) serves to prevent any build-up of pressure in one passage 55, 56 relative to the other when equality is desired and no motion of apparatus controlled by the fluids in 55, 56 is desired.

Prior constructions of this general type have had lands of spherical or football shape, positioned relative to circumferential slots in the surrounding sleeve, but, due to the length of the slot, slight axial off-neutral positioning of the land resulted in rapidly increasing pressure loss through the port, and excessive leakage, particularly if the slot port is made wide for capacity. Such prior constructions usually had a pair of abutting sleeve sections adjacent each land, spaced in some manner to provide the port; thereby doubling the number of sleeve sections to be accurately made and aligned, as compared to our improved construction.

The use of round bored holes 51 as ports, in our improved pilot valve, provides the simplest of manufacturing procedure with wide range in capacity, sensitivity and pressure characteristic. With the construction shown (four ports 51 in Fig. 8), by increasing the number of ports the capacity for increments of land movement may be increased, and vice versa. By changing the diameter of the ports 51 (with corresponding change in length of land 61) not only may the relation between full axial land travel and full range of pressure be varied but the characteristic curve shape may be varied. The latter effect is apparent because axial movement of a land uncovers an increasing port area until maximum diameter of the port is reached. Inasmuch as the arc of the segment uncovered is less for small holes than for large holes the flow or pressure characteristic will vary with diameter of port holes 51.

Thus it will be seen that by changing the number and/or diameter of the ports and length of land we can attain a desired balance between capacity, sensitivity, motion of the stem 59, and characteristic curve; and accomplish it through the easiest of machining operations, making cylinder sections and drilling round holes.

The lands 60, 61 are integral with pilot stem 59 and Fig. 7 purposely shows the assembly downward from alignment with ports 50, 51 so that the ports will not be covered up. The spacing of the lands is fixed but the stem assembly may be raised or lowered relative to block 40 by knurled screw 112. On the other hand the spacing of the ports as well as the location of both sets of ports axially in bore 44 may be changed by knurled caps 48, 48A, one or both of which may have locking means as shown on 48.

Of course, a capacity change may be made by changing the diameter of bores 244, 244′ and of lands 60, 61. In the present example this diameter is $\frac{1}{16}$ inch and with four $\frac{3}{32}$ inch holes and a land length of $\frac{3}{32}$ inch we have found less air leakage with greater capacity and equal or better sensitivity than with prior larger constructions.

Referring again to Figs. 1 and 2 it will be seen that our positioner 1 has a beam 4, pivoted at 5, and loaded by bellows 32 and spring 11 for positioning the pilot stem 59 in pilot valve block 40. Movement of the beam is limited by stops 114, 115 either or both of which may be adjustable. The cam 29 and follower mechanism provides a motion tieback so that the relationship of loading pressure applied to bellows 32 to the position of the controlled object (as represented by position of arm 28) can be modified to give a desired characteristic of loading pressure versus fluid flow or other variable.

What we claim as new and desire to secure by United States Letters Patent, is:

1. In a regulating mechanism, the combination of a member supported for movement in a given plane, a pilot valve for producing a regulating effect, said pilot valve including an elongated valve element supported for movement in a plane substantially normal to said member, adjustable means carried by said member and providing a flat surface engageable by one end of said valve element, and means carried by said member while separate from the member and universally yieldable and engaging the opposite end of said valve element for holding the latter in engagement with said flat surface.

2. In a regulating mechanism, the combination of a pilot valve positioning member, a pilot valve for producing a regulating effect, said pilot valve including an elongated valve element guided for movement by said positioning member, the positioning member providing a flat surface engageable by one end of said valve member, and universally yieldable means spanning the valve element, one end of said universally yieldable means carried by the positioning member and the other end engaging the other end of said valve member to thereby result in a positioning of said valve member by and with the positioning member in non-rigid manner but without lost motion and irrespective of slight misalignment between the members.

3. A pilot valve comprising a casing having a passageway through which fluid continuously flows from a pressure supply, said passageway having an inlet port from the pressure supply, a bleed port to a region of lower pressure, a plurality of circular outlet ports joining the passageway radially in a plane normal to the axis of the passageway and intermediate said inlet and bleed ports, and a cylindrical land means in said passageway and substantially coextensive in axial length with the diameter of said outlet ports when registering with the ports and providing a restriction to the flow of pressure fluid from the inlet port to the bleed port past the land in the passageway thereby providing a film of moving fluid between the land and passageway to center the land therein and to provide against possible friction between said land and the walls defining the passageway.

4. The pilot valve of claim 3 including an outlet passage in the casing joining the plurality of circular outlet ports, and means for axially moving the land in the passageway toward the bleed port away from the inlet port thus progressively uncovering the circular outlet port openings to vary the loading pressure available in said outlet passage.

5. A pilot valve comprising a casing having a passageway open to the atmosphere at each end and through which fluid continually flows from a pressure supply, an inlet port from the pressure supply to the passageway intermediate the ends, an outlet passage through the casing to the passageway on each side of the inlet port, a pair of similar sleeve members within the passageway overlying the outlet passages and having a recess around the outer surface of each sleeve one registering with one outlet passage and the other with the other, yieldable means spacing the sleeves, adjustable means at the ends of the casing for positioning the sleeves in desired relation to the outlet passages, a plurality of circular outlet ports through each sleeve radially of the passageway in a plane normal to the axis and joining the recess and thereby the respective outlet port, a pilot valve stem extending from one end of the passageway for positioning, said stem having two cylindrical land enlargements spaced to register with the two sets of circular outlet ports of the sleeves, each land substantially coextensive in axial length with the diameter of the adjacent circular outlet ports when registering with the ports and providing a restriction to the flow of pressure fluid from the inlet port to atmosphere at each end of the passageway thereby providing a film of moving fluid between each land and its related sleeve to center the lands therein and thus to provide against possible friction between the lands and the inner walls of the sleeves, axial positioning of said stem and lands progressively uncovering the two sets of circular outlet ports so that fluid pressure progressively builds up in one outlet passage as it progressively decays in the other.

6. A pilot valve including in combination, a valve block having a bore extending therethrough, sleeve members in said bore engageable with adjustable caps at its ends, each of said sleeve members being provided with circular ports between the ends thereof, a valve stem having spaced cylindrical lands cooperative with said ports variably controlling fluid pressure communication between the latter and said bore, said valve block being provided with an opening for supplying pressure fluid to said bore at a point between said sleeve members, and other openings alignable with said ports of said sleeve members for delivering variable pressure from said pilot valve.

7. In a fluid pressure regulating mechanism, the combination including an actuating member supported for movement in a given plane, a pilot valve including a valve block having a bore extending therethrough, sleeve members in said bore engageable with adjustable caps on each end of the valve block each engageable with the adjacent end of one sleeve member, yielding means arranged between said sleeve members for holding the latter in engagement with said caps, each of said sleeve members being provided with circular ports between the ends thereof, an elongated valve element supported for movement in a plane substantially normal to said actuating member, adjustable means carried by said actuating member and providing a flat surface engageable with one end of said valve element, and means carried by said actuating member and engaging the other end of said valve element for holding the latter in engagement with said flat surface, said valve block being provided with an opening for supplying pressure fluid to said bore at a point between said sleeve members, and other openings alignable with the ports of said sleeve members for delivering pressure from said pilot valve, said valve element having spaced cylindrical lands cooperating with said ports variably controlling fluid pressure communication between the latter and said bore, whereby adjustment of said caps varies the relative position of the lands and ports and adjustment of said flat surface repositions the relative position of the lands and ports for any given position of the actuating member.

References Cited in the file of this patent

UNITED STATES PATENTS

| Number | Name | Date |
|---|---|---|
| 312,724 | Jarboe | Feb. 24, 1885 |
| 1,967,851 | Wilson | July 24, 1934 |
| 2,022,791 | Tetlow | Dec. 3, 1935 |
| 2,054,464 | Johnson | Sept. 15, 1936 |
| 2,157,240 | Keel | May 9, 1939 |
| 2,410,404 | Buchanan | Nov. 5, 1946 |
| 2,415,417 | Collins | Feb. 11, 1947 |
| 2,485,504 | Morgan | Oct. 18, 1949 |
| 2,503,827 | Langmore | Apr. 11, 1950 |
| 2,588,202 | Breit | Mar. 4, 1952 |